May 3, 1966  W. M. SILLERS, JR  3,249,929
MONITORING CIRCUIT FOR ALTERNATING CURRENT SIGNALS
Filed May 16, 1963
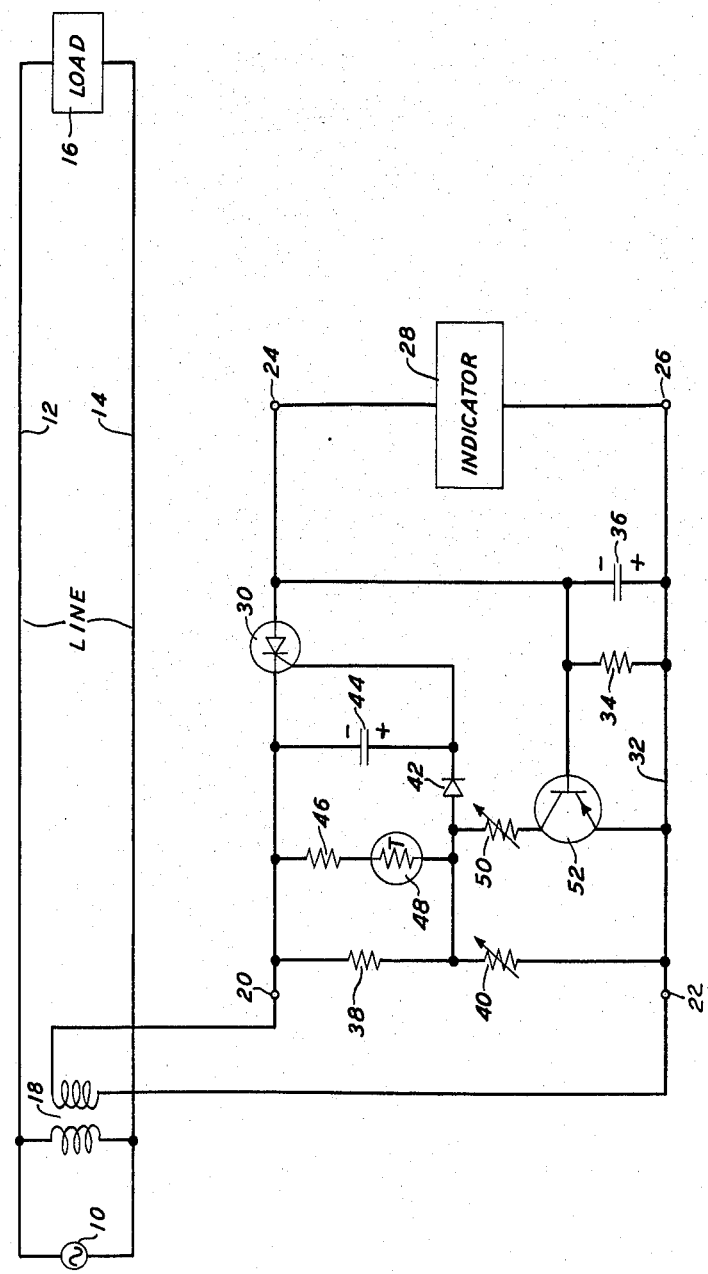
INVENTOR
W. M. SILLERS, JR.
BY
ATTORNEY

United States Patent Office 3,249,929
Patented May 3, 1966

3,249,929
MONITORING CIRCUIT FOR ALTERNATING
CURRENT SIGNALS
William M. Sillers, Jr., Mendham, N.J., assignor to Bell
Telephone Laboratories, Incorporated, New York,
N.Y., a corporation of New York
Filed May 16, 1963, Ser. No. 280,890
5 Claims. (Cl. 340—248)

This invention relates to monitoring circuits and more particularly to a circuit for providing a bistate output indicative of whether or not an alternating current input falls within a predetermined range of values, the limits of which are independently adjustable.

In many applications and, in particular, in control circuitry for such diverse applications as the automatic protection switching of radio relay channels or the substitution of engine-driven alternators for commercial power sources as an emergency power supply, it becomes necessary to provide an indication whenever an alternating current voltage fails to remain within predetermined limits. There are, of course, many monitoring circuits available for such applications and the present invention is directed toward the simplification of such circuitry through the use of solid-state devices as the active elements in a monitoring circuit capable of performing the desired function.

In accordance with the invention, therefore, a monitoring circuit for alternating current signals comprises paired input terminals to which the alternating current signal may be applied and paired output terminals between which an on-off or bistate indicator, such as a light or other signal, may be connected. The anode-cathode path of a silicon controlled rectifier is connected in series in a lead interconnecting corresponding ones of the input and output terminals. Means are provided for rectifying a portion of the alternating current voltage appearing between the input terminals and applying the rectified portion as a control voltage to the gate element of the silicon controlled rectifier. A switch, operable in response to the appearance of an output from the silicon controlled rectifier, is effective to change the proportion of the total alternating current input applied as a control signal to the silicon controlled rectifier. The two proportions of the total input, that is, that originally applied to gate the silicon controlled rectifier on and that applied to the gate element after the silicon controlled rectifier is turned on, are, according to the invention, made independently adjustable so that a range of alternating current voltage values may be identified and monitored by the circuit.

The single figure of the drawing is a schematic circuit diagram of an alternating current voltage monitor, according to the invention, shown as applied to monitor the alternating current supplied to a load by a generator, the load and generator being interconnected by a power line or bus. In the drawing, therefore, an alternating current generator 10 is shown connected by paired conductors 12 and 14, constituting a power transmission bus or line to a load 16. These elements may constitute, for example, a source of commerical power and a load normally carried by the source. The condition of the line is monitored by the circuit of the invention which includes a pick-off transformer 18, the primary winding of which is connected between conductors 12 and 14 and the secondary winding of which is connected between input terminals 20 and 22 of the monitoring circuit proper. The output of the monitoring circuit appears between output terminals 24 and 26 and is shown as applied to an indicator 28. This indicator may take any of a large variety of forms and, as will appear hereinafter, it is necessary only that it be capable of responding to a binary output, that is, an on-off signal, to indicate or record which of the two signal states is present between output terminals 24 and 26.

In the monitoring circuit, a silicon controlled rectifier 30, having anode, cathode, and gate elements, is connected in series between input terminal 20 and output terminal 24 by way of its anode-cathode path. The remaining terminals, namely, input terminal 22 and output terminal 26, may be connected directly together by way of a lead 32. It is characteristic of a silicon controlled rectifier device, such as that shown at 30, that when a sufficient forward potential exists between the anode and cathode, and when the same time a potential which is sufficiently positive with respect to the cathode is applied to the gating element, conduction will occur in the anode-cathode path. It is further characteristic of this device that when the anode-cathode potential is such that these elements are reverse biased, no substantial conduction will occur regardless of the state of the potential applied to the gating element. Thus it may be seen that in the presence of an adequate positive potential at the gating element, silicon controlled rectifier 30 will conduct only during the positive half cycles of the alternating current wave applied between input terminals 20 and 22. This half-wave rectified conduction current may be smoothed in the usual fashion by the shunt connection of a resistor 34 and a capacitor 36 which are connected in parallel between output terminals 24 and 26. The smoothed current applied to indicator 28 will then serve to indicate one of the two output conditions. When the potential at the gate element of silicon controlled rectifier 30 is insufficient to permit conduction, no output potential will appear between terminals 24 and 26, thus providing the second of the two output indications at indicator 28.

Control of the operation of silicon controlled rectifier 30 to serve as a switch between the two output states just referred to in dependence upon whether or not the alternating current voltage applied between terminals 20 and 22 is or is not between predetermined limits, is effected through the use of auxiliary circuitry now to be described. Basically, a sample of the alternating current signal appearing between these terminals is abstracted by way of an impedance divider shown in the drawing as comprising a fixed resistor 38 and a variable resistor 40. It will be understood that the portion of the total alternating current voltage applied between terminals 20 and 22 appearing between the junction of resistors 38 and 40 may be adjusted by variable resistor 40. This portion, that is, the alternating current voltage between input terminal 20 and the junction point of the divider is half-wave rectified by a solid-state diode 42, smoothed by a capacitor 44, and applied to the gating element of silicon controlled rectifier 30 as a control signal. Conveniently, although not necessarily, a resistor 46 and a thermistor 48 are connected in series between the terminals of capacitor 44 to provide temperature stabilization for the entire monitoring circuit.

In the operation of the monitoring circuit as thus far described and in dependence upon the characteristics of the particular solid-state controlled rectifier employed, variable resistor 40 may be adjusted so that the silicon controlled rectifier 30 will fire, i.e. conduct, during half cycles of the alternating current input when that voltage is equal to a fixed percentage, say 94 percent, for example, of the desired voltage for application to load 16 by generator 10. Under these circumstances and during each positive half cycle of applied voltage, rectifier 42 will conduct, applying a charge to capacitor 44 which is appropriately poled to drive the gating element of the controlled rectifier positive with respect to the cathode element, thus permitting the controlled rectifier to conduct during positive half cycles of the alternating current voltage wave.

As outlined above, such conduction through the silicon controlled rectifier will result in an appropriate indication by indicator 28 and will persist as long as the percentage chosen by adjustment of resistor 40 is maintained. However, if this value of alternating current input is not maintained for as short a time as a cycle or two (the time required for discharge of capacitor 44), silicon controlled rectifier 30 will be extinguished and the indicator will record an unsatisfactory power condition on the power bus between generator 10 and the load 16. Since such discrepancies may be transitory, it is highly desirable to provide a range of values for which a satisfactory output is shown by indicator 28. For this reason it is desirable, for example, to produce a satisfactory output indication as long as the alternating current input wave falls within the range of a few percent, say for example, 92 to 94 percent of the desired value. Under some circumstances, of course, a wider range may be desired.

Such indication is provided, according to the invention, through the use of a switch operated whenever the silicon controlled rectifier is producing an output to change the portion of the total input signal appearing between input terminals 20 and 22, which is applied as a controlled voltage to the gating element of the silicon controlled rectifier. To this end, a second variable impedance, shown as a variable resistor 50, may be connected in parallel with resistor 40 by way of the emitter-collector path of a transistor 52, the base of which is connected to the output of silicon controlled rectifier 30. When no output appears between output terminals 24 and 26, the base and emitter of transistor 52 are at essentially the same potential and the emitter-collector path of transistor 52 is essentially an open circuit. When the silicon controlled rectifier 30 does conduct, however, the charge appearing across capacitor 36 is such as to make the base of the transistor negative with respect to its emitter, driving it into saturation and effectively connecting variable resistor 50 in parallel with variable resistor 40. Under these circumstances, the portion of the total alternating current voltage available as a control signal is increased. Thus, a lower percentage of the desired output voltage appearing on the power bus will suffice to maintain silicon controlled rectifier 30 in the condition of conduction or, stated in another way, the input voltage must fall to a predetermined lower percentage of the desired value than that required to turn the silicon controlled rectifier on before the silicon controlled rectifier will be turned off. It is evident that the two limits may be made independently adjustable in the arrangement shown and described.

What is claimed is:

1. A monitoring circuit for a source of alternating current signals comprising paired input and output terminals, a silicon controlled rectifier having anode, cathode, and gate elements, leads interconnecting corresponding ones of said input and output terminals, one of said leads including the anode-cathode circuit of said silicon controlled rectifier, means connecting said source between said input terminals, indicating means connected between said output terminals, means for applying a sample of adjustable magnitude of the signal from said source to the gate element of said silicon controlled rectifier, said applying means including means for rectifying the sample so applied, and adjustable means responsive to an output from said silicon controlled rectifier for changing the magnitude of said sample applied to said silicon controlled rectifier.

2. A monitoring circuit for a source of alternating current signals comprising paired input and output terminals, a silicon controlled rectifier having anode, cathode, and gate elements, leads interconnecting corresponding ones of said input and output terminals, one of said leads including the anode-cathode circuit of said silicon controlled rectifier, means connecting said source between said input terminals, indicating means connected between said output terminals, an impedance divider comprising first and second resistors arranged in series and connected between said input terminals, rectifying means interconnecting the junction of said first and second resistors and the gate element of said silicon controlled rectifier, one of said resistors being adjustable to set the signal level at which said silicon controlled rectifier is rendered conducting, and adjustable means responsive to an output from said silicon controlled rectifier for changing the signal level appearing at the junction of said first and second resistors to set the level at which said silicon controlled rectifier is rendered non-conducting.

3. A monitoring circuit for a source of alternating current signals comprising paired input and output terminals, a silicon controlled rectifier having anode, cathode, and gate elements, leads interconnecting corresponding ones of said input and output terminals, one of said leads including the anode-cathode circuit of said silicon controlled rectifier, means connecting said source between said input terminals, an impedance divider comprising first and second resistors connected between said input terminal rectifying means interconnecting the junction of said divider and the gate element of said silicon controlled rectifier, one of said resistors being adjustable to set the signal level at which said silicon controlled rectifier becomes conducting, and switching means responsive to the output of said silicon controlled rectified for connecting a third resistor in parallel with said adjustable resistor when said silicon controlled rectifier conducts to set the signal level below which the input must fall to turn off said silicon controlled rectifier.

4. A monitoring circuit for a source of alternating current signals comprising paired input and output terminals, a silicon controlled rectifier having anode, cathode, and gate elements, leads interconnecting corresponding ones of said input and output terminals, one of said leads including the anode-cathode circuit of said silicon controlled rectifier, means connecting said source between said input terminals, indicating means connected between said output terminals, an impedance divider comprising first and second resistors connected between said input terminals, rectifying means interconnecting the junction of said divider and the gate element of said silicon controlled rectifier to set the signal level at which said silicon controlled rectifier becomes conducting, a transistor switch having at least input, output, and control elements, an adjustable resistor, means connecting the input-output circuit of said switch in series with said adjustable resistor across one of said divider resistors, and means for supplying the output of said silicon controlled rectifier to the control element of said transistor.

5. A monitoring circuit for a source of alternating current signals comprising paired input and output terminals, a silicon controlled rectifier having anode, cathode, and gate elements, leads interconnecting corresponding ones of said input and output terminals, one of said leads including the anode-cathode circuit of said silicon controlled rectifier, means connecting said source between said input terminals, indicating means connected between said output terminals, a pair of resistors connected in series between said input terminals, the first of said resistors being connected also between the cathode and gate elements of the silicon controlled rectifier by way of a rectifier unit, the other of said resistors being adjustable to set the firing level of said silicon controlled rectifier, and means responsive only upon the appearance of an output from said silicon controlled rectifier for connecting a second resistor in parallel with said other resistor to set the turn-off level of said silicon controlled rectifier.

References Cited by the Examiner
UNITED STATES PATENTS

| | | | |
|---|---|---|---|
| 2,808,471 | 10/1957 | Poucel et al | 307—88.5 |
| 3,165,688 | 1/1965 | Gutzwiller | 307—88.5 |
| 3,184,672 | 5/1965 | Mason et al. | 307—88.5 |

NEIL C. READ, *Primary Examiner.*

D. K. MYER, *Assistant Examiner.*